June 19, 1928.
W. A. DOREY
1,674,164
LUMINAIRE
Original Filed March 26, 1924  2 Sheets-Sheet 1
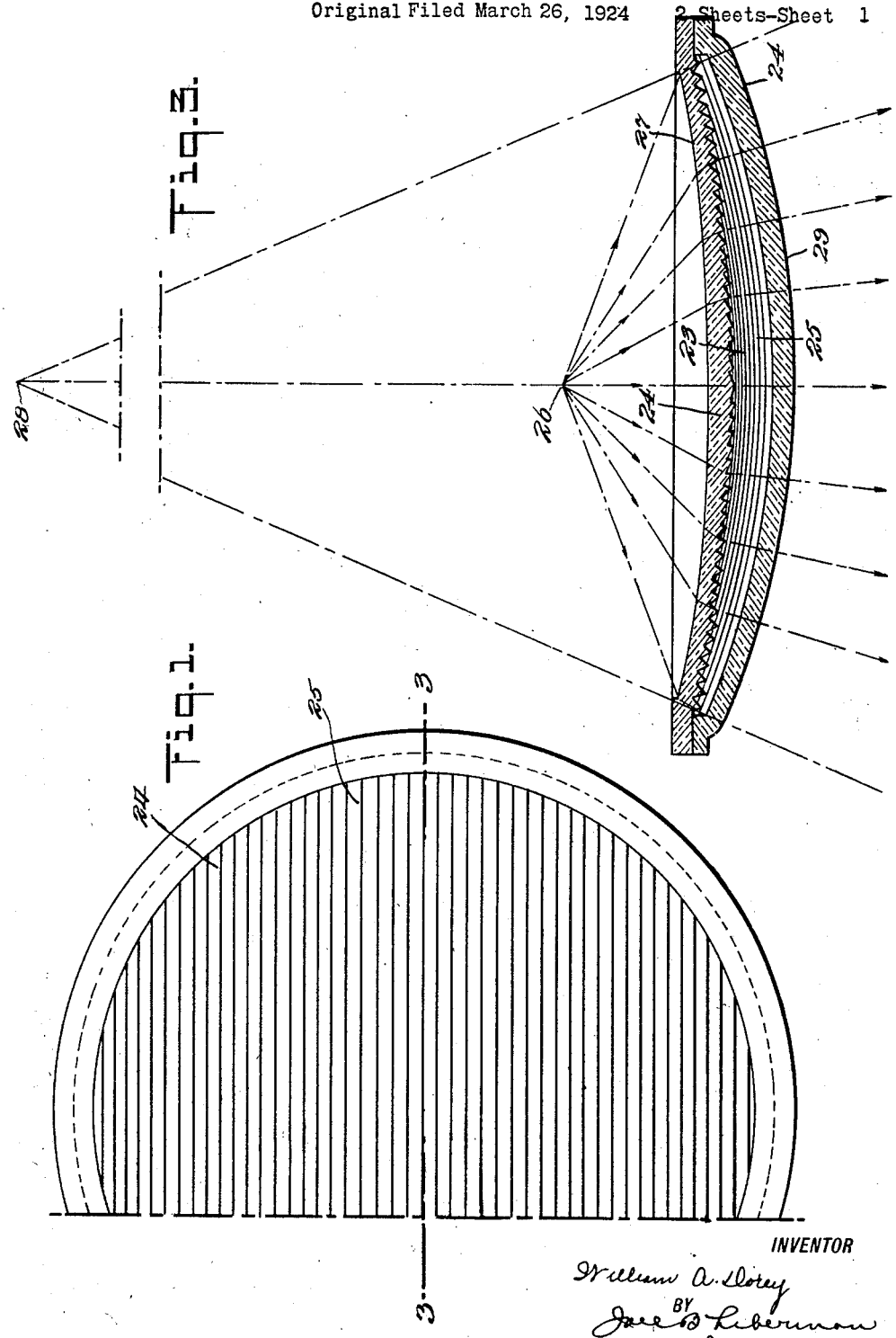

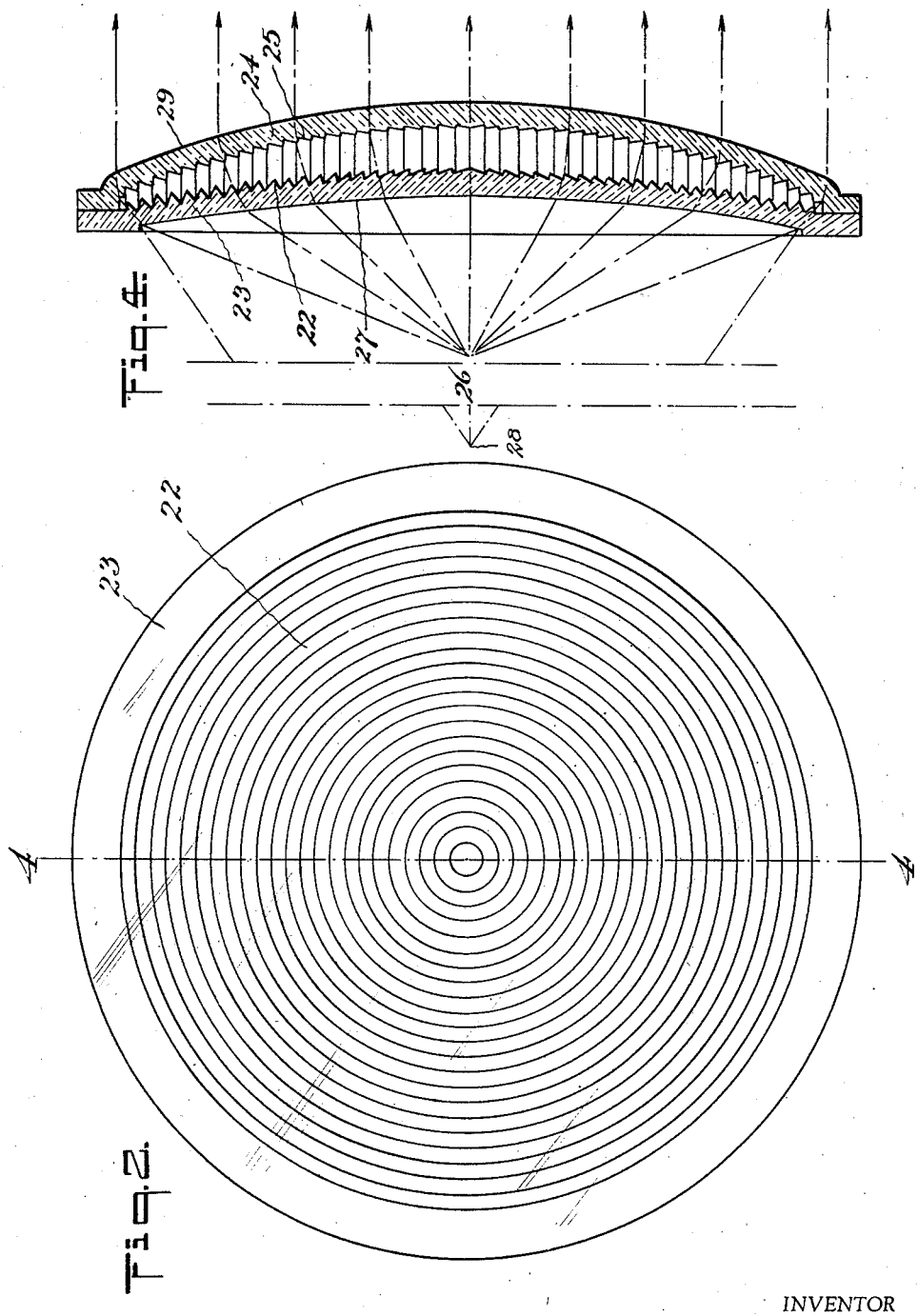

Patented June 19, 1928.

1,674,164

UNITED STATES PATENT OFFICE.

WILLIAM A. DOREY, OF NEWARK, OHIO, ASSIGNOR, BY MESNE ASSIGNMENTS, TO HOLOPHANE COMPANY, INC., OF NEW YORK, N. Y., A CORPORATION OF NEW YORK.

LUMINAIRE.

Application filed March 26, 1924, Serial No. 701,970. Renewed July 20, 1926.

The object of my invention is the construction of luminaires having transmitting envelopes made up of a glass structure provided with prismatic corrugations arranged to give concentration of light in one direction and a moderate spread of light in directions at right angles thereto. This is accomplished by one or more envelopes providing one surface consisting of concentric refracting prisms designed to give a moderate concentration of light and a surface cooperating therewith consisting of substantially parallel corrugations adapted to produce increased concentration of the light in planes at right angles to the corrugations and to permit transmission of the beam in planes parallel to the corrugations without substantial change in direction.

Fig. 1 is a plan view of the outer glass illustrating the type of corrugations used in my appliance.

Fig. 2 is a plan view of an inner glass, and

Fig. 3 is a horizontal cross section of the combination of glasses shown in Figs. 1 and 2.

Fig. 4 is a horizontal cross section of the glasses combined.

The most important use of the invention is in cases where it is desired to illuminate restricted areas from sources mounted at the side and relatively close to the general surface of the area and at the same time it is desirable to cut off the light at high angles; this sort of condition is illustrated by the condition of lighting stair treads by luminaires recessed or mounted direct on the side wall, in local lighting as in some varieties of machine tool work and in other similar problems. In a great many other cases the reduction in the depth of the luminaire has great structural and operative advantages and makes the use of my invention much more satisfactory for the purpose than the ordinary forms of projection devices employing parabolic mirrored reflectors.

In the figures the construction is shown as made up in plates of circular contour having general surfaces which are portions of spheres. The inner glass 23 has its convex surface covered with concentric prisms 22, and the outer glass 24 has its inner concave surface covered with horizontal prisms 25.

In Figs. 3 and 4, 26 is the light source considered as a point, the smooth inner surface 27 of the glass 23 being of such curvature that the outer elements of the cone of light included by it will be incident at angles which will not cause serious losses due to surface reflection. The angle of incidence of all other rays in the cone will necessarily be less than this. The prisms 22 on plate 23 are so constructed that the extreme outer rays from the source proceeding through the glass make an angle of incidence on the prism surface within the limit at which serious loss due to surface reflection begins, and the prismatic rings within this boundary are so arranged as to give still less surface reflection and to produce a divergent cone of light emitted from the glass 23 with a virtual apex at 28 as shown in Fig. 3.

This invention is adapted for constructions where concentric prisms are used to cooperate with horizontal parallel prisms, the concentric prisms being formed so as to gather widely divergent light rays from a source into a beam of moderate divergence and the horizontal prisms being adapted to concentrate this beam in vertical planes. The distribution in lateral planes will tend to remain of the same divergence as the cone of light originating from the concentric prism construction. The invention is of especial value in making effective use of a very large angle of light from the source to produce a beam of very small angle in vertical plane and considerable divergence in the lateral plane. While flat plates may be used to good effect I prefer in general to use convex spherical contours because a greater angle of light may be included without undue loss from surface reflection.

I have shown this design of glass in circular form in order to simplify the description. It may very readily be applied to square, rectangular or other straight-sided panel forms for incorporation in lantern shapes by making the flanges of the outline desired and wholly within the circular outline shown and virtually cutting away the superfluous portions of the glasses by means of side walls substantially perpendicular to the flanges. The modification above described is applicable to glasses having plane surfaces, where it is desired to simplify the arrangement in panel form for use in lanterns and maximum inclusion of the light from the source is not essential. The plates described singly or in groups are adapted for use where a beam of light of rectangular cross section is required and an even distribution of brightness across the face of the glass is not of prime importance.

In the type illustrated and described, the cones of light forming the emitted beam from the concentric prisms, have a common apex (28) and it is evident, however, that these cones may have separate apices if such design is found desirable in order to modify the distribution in the resultant beam. The invention can be applied to a single piece of glass as well as in a double structure.

I claim:

1. A luminaire comprising a light source, and a glass transmitting screen having one surface provided with concentric prisms formed to gather widely divergent rays from the source into a beam of moderate divergence and the opposed surface provided with parallel corrugations adapted to concentrate this beam of light in planes at right angles to the corrugations and to permit divergence in planes parallel to the corrugations.

2. A luminaire comprising a light source, and a glass transmitting screen having an outward surface provided with concentric prisms formed to gather widely divergent rays from the source into a beam of moderate divergence and an inward surface provided with parallel corrugations adapted to concentrate this beam of light in planes at right angles to the corrugations and to permit divergence in planes parallel to the corrugations.

3. A luminaire comprising a light source, and a glass transmitting screen consisting of two covers, an inner cover provided with concentric prisms on its outward surface formed to gather widely divergent rays from the source into a beam of moderate divergence and an outer cover having on its inward surface parallel corrugations adapted to concentrate this beam of light in planes at right angles to the corrugations and to permit divergence in planes parallel to the corrugations.

4. A luminaire comprising a light source, and a glass transmitting screen having one surface provided with a system of curvilinear prisms formed to deviate divergent rays from the source towards the inner sides of the curves and the opposed surface provided with substantially parallel corrugations adapted to increase the deviation of the rays in planes at right angles to the corrugations.

5. A luminaire comprising a light source, and a glass transmitting screen having one surface provided with concentric prisms formed to gather widely divergent rays from the source into a beam of moderate divergence and the opposed surface provided with substantially parallel corrugations adapted to concentrate this beam of light in planes at right angles to the corrugations, the axis of the concentric prisms being set at an angle with reference to the axis of the parallel corrugations.

6. A luminaire comprising a light source and a glass transmitting screen having one surface provided with a plurality of systems of curvilinear prisms formed to gather widely divergent rays from the source into beams of moderate divergence and the opposed surface provided with substantially parallel corrugations adapted to concentrate these beams of light in planes at right angles to the corrugations, the axes of the curved prism systems being set at wide angles with reference to the axis of the parallel corrugations.

Signed at Newark, in the county of Licking, and State of Ohio, this 24th day of March, 1924.

WILLIAM A. DOREY.